United States Patent [19]
Ravid

[11] Patent Number: 5,517,089
[45] Date of Patent: May 14, 1996

[54] REGULATED ELECTROLUMINESCENT PANEL POWER SUPPLY

[75] Inventor: Arie Ravid, Palo Alto, Calif.

[73] Assignee: Abbott Laboratories, Abbott Park, Ill.

[21] Appl. No.: 145,072

[22] Filed: Oct. 28, 1993

[51] Int. Cl.$^6$ .................................................. H05B 37/02
[52] U.S. Cl. .................... 315/307; 315/169.3; 315/219; 315/205
[58] Field of Search ................... 315/169.3, 219, 315/220, 224, 244, 307, DIG. 7, 205

[56] References Cited

U.S. PATENT DOCUMENTS

| | | | |
|---|---|---|---|
| 4,392,087 | 7/1983 | Zansky | 315/291 |
| 4,443,741 | 4/1984 | Tanaka et al. | 315/169.3 |
| 4,529,913 | 7/1985 | Brosillon | 315/224 |
| 4,553,070 | 11/1985 | Sairanen | 315/DIG. 7 |
| 4,611,150 | 9/1986 | Ball et al. | 315/307 |
| 4,891,563 | 1/1990 | Ganser et al. | 315/224 |
| 4,920,302 | 4/1990 | Konopka | 315/307 |
| 5,144,203 | 9/1992 | Fujita et al. | 315/169.3 |
| 5,191,263 | 3/1993 | Konopka | 315/219 |

Primary Examiner—Robert Pascal
Assistant Examiner—Darius Gambino
Attorney, Agent, or Firm—Ronald M. Anderson

[57] ABSTRACT

A power supply that converts an unregulated DC voltage source to a regulated AC power source suitable for energizing an electroluminescent panel. The DC voltage source powers a DC-to-AC inverter to generate an AC output. A feedback circuit monitors the AC output and compensates for any changes in amplitude that arise due to fluctuations in the DC input voltage. A single reference voltage is used to both selectively energize and deenergize the circuit and to control the amplitude of the AC output.

20 Claims, 2 Drawing Sheets

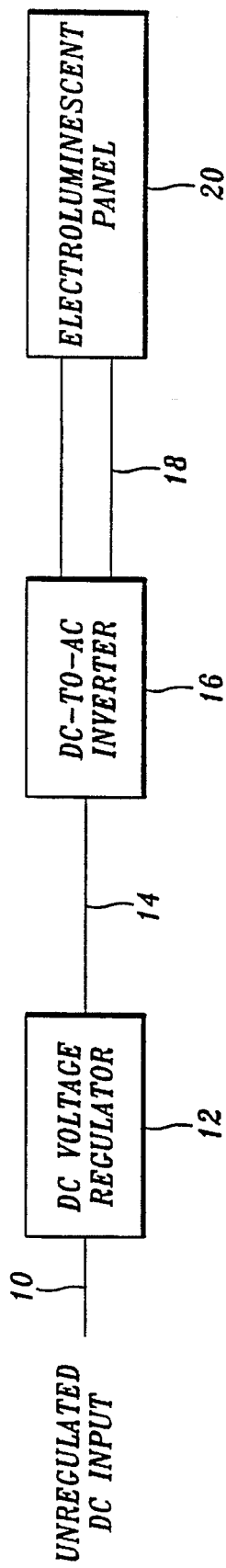
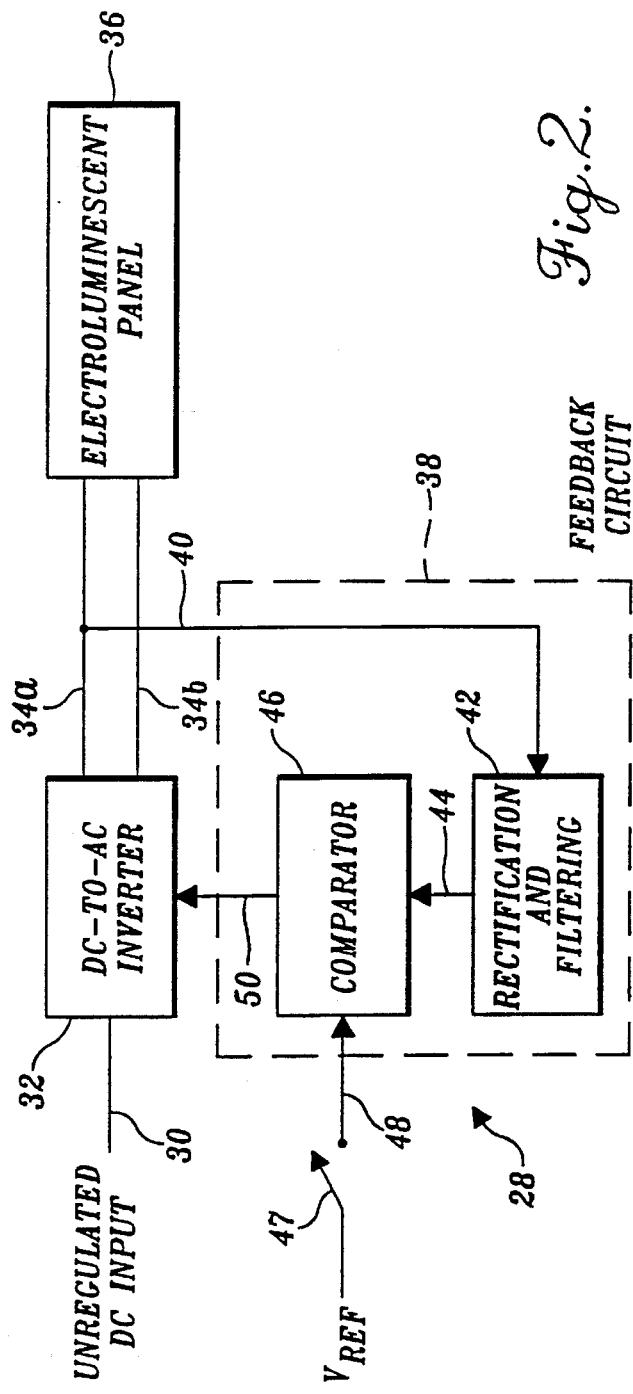

REGULATED ELECTROLUMINESCENT PANEL POWER SUPPLY

FIELD OF THE INVENTION

The present invention relates generally to power supplies and, in particular, to power supplies for electroluminescent panels.

BACKGROUND OF THE INVENTION

Electroluminescent panels are often used in applications where only direct current (DC) power is available to energize the panels. This limitation poses unique problems because of the operating requirements of an electroluminescent panel. Electroluminescent panels must be energized with an alternating current (AC) of several hundred volts, and the life and brightness of an electroluminescent panel is determined by the voltage and frequency of the AC. In addition, the brightness of the display on an electroluminescent panel is directly proportional to the voltage and frequency of the power supplied to the panel.

In order for an electroluminescent panel to operate from a DC power source, the DC must therefore be converted to AC. The preferred conversion method is to use a DC-to-AC inverter. However, the input impedance, and more particularly, the characteristic capacitance of the electroluminescent panel must be considered in designing or selecting an inverter for this purpose. When viewed from the input terminals, an electroluminescent panel is primarily a capacitive load. Since an inverter incorporates inductors to step-up and convert the DC voltage to AC, the capacitance of the electroluminescent panel and the inductance of the inverter output interact to determine the frequency of inverter oscillation. The frequency of oscillation is approximated by the expression $1/2\pi\sqrt{LC}$, where L is the inductance of the inverter as viewed from the output terminals, and C the capacitance of the electroluminescent panel. As an electroluminescent panel ages, the capacitance of the panel decreases. Without compensation, this decrease in capacitance causes the intensity of the panel to dim over time. However, as should be evident from the above expression, an advantage of the interaction between the electroluminescent panel and an inverter designed to interact with the capacitance of the panel is that the decrease in capacitance causes the oscillation frequency of the inverter to increase. Since a higher frequency AC signal applied to provide power to electroluminescent panel increases its light output, the intensity of the panel remains substantially constant through the life of the panel.

While a DC-to-AC inverter is preferred as a power supply for an electroluminescent panel, there are further requirements that must be considered in providing power for this purpose. Frequently, an electroluminescent panel is used in applications where the DC voltage source is unregulated. For example, if the application is powered by batteries, the DC voltage input to the inverter will vary as the batteries age or are loaded by another part of the circuit. Also, certain types of batteries, such as lead-acid, exhibit a reduction in output voltage as they discharge. If this fluctuation in the input voltage is uncompensated, it will cause the brightness of the electroluminescent panel to vary as the AC output from the inverter varies with the changing DC.

In situations where an unregulated DC voltage source is used to provide power, additional DC regulation circuitry must be used to ensure that the electroluminescent panel maintains a constant brightness regardless of changes in the input voltage. Traditionally, as shown in the prior art circuit of FIG. 1, unregulated DC voltage 10 is regulated by a DC voltage regulator 12. This circuit uses feedback to ensure that the DC voltage output from the regulator remains constant even if the input DC voltage fluctuates. The regulated output 14 from the DC voltage regulator is then fed into DC-to-AC inverter 16. The AC output 18 of the inverter to power an electroluminescent panel 20 remains constant, because the input DC voltage is regulated to a constant level.

At least two disadvantages arise from this technique of powering an electroluminescent panel. First, the regulation of the DC voltage requires additional major circuit components, making the circuit more expensive and increasing the chance that a component failure will necessitate circuit repair. Second, the use of a two-stage process consumes additional power. Energy is lost in both the DC regulation stage and the DC-to-AC inversion stage. This inefficiency is especially of concern when batteries are used to power the electroluminescent panel, because it then becomes important to extend battery life for as long as possible.

As will be appreciated from the preceding discussion, it would be desirable to provide a power supply for an electroluminescent panel that incorporated a DC-to-AC inverter, yet simplified the means for regulating the AC output voltage to maintain a constant intensity in the light output from the panel. The DC-to-AC inverter should include the automatic compensation for the decrease in capacitance that occurs over the life of the electroluminescent panel, as is known in the prior art. However, unlike the prior art, the power supply should not require a separate DC regulator, even when provided with DC input power from an unregulated source. By using a simplified regulation method, the number of components necessary for the circuit can be reduced, thus improving circuit reliability as well as decreasing cost and increasing power efficiency.

SUMMARY OF THE INVENTION

According to the present invention, a regulated electroluminescent panel power supply is disclosed that contains a feedback circuit to monitor the AC output from a DC-to-AC inverter and compensate for any changes due to fluctuations in the DC input voltage. The feedback circuit rectifies and filters the AC voltage before comparing it to a reference voltage that is selected to maintain a desired light level from the electroluminescent panel. If the AC voltage from the inverter drops due to lower DC input, the feedback circuit generates a control signal to boost the output from the inverter. Conversely, if the AC voltage from the inverter exceeds the desired amplitude necessary to drive the electroluminescent panel, the feedback circuit generates a control signal to reduce the output voltage. In this manner, the output from the DC-to-AC inverter remains constant over a broad range of DC input values. Also included are means for compensating changes in an input capacitance of the electroluminescent panel.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a block diagram of a prior art power supply for an electroluminescent panel;

FIG. 2 is a block diagram of a power supply for an electroluminescent panel according to the present invention.

DETAILED DESCRIPTION OF THE PREFERRED EMBODIMENT

Figure 3:
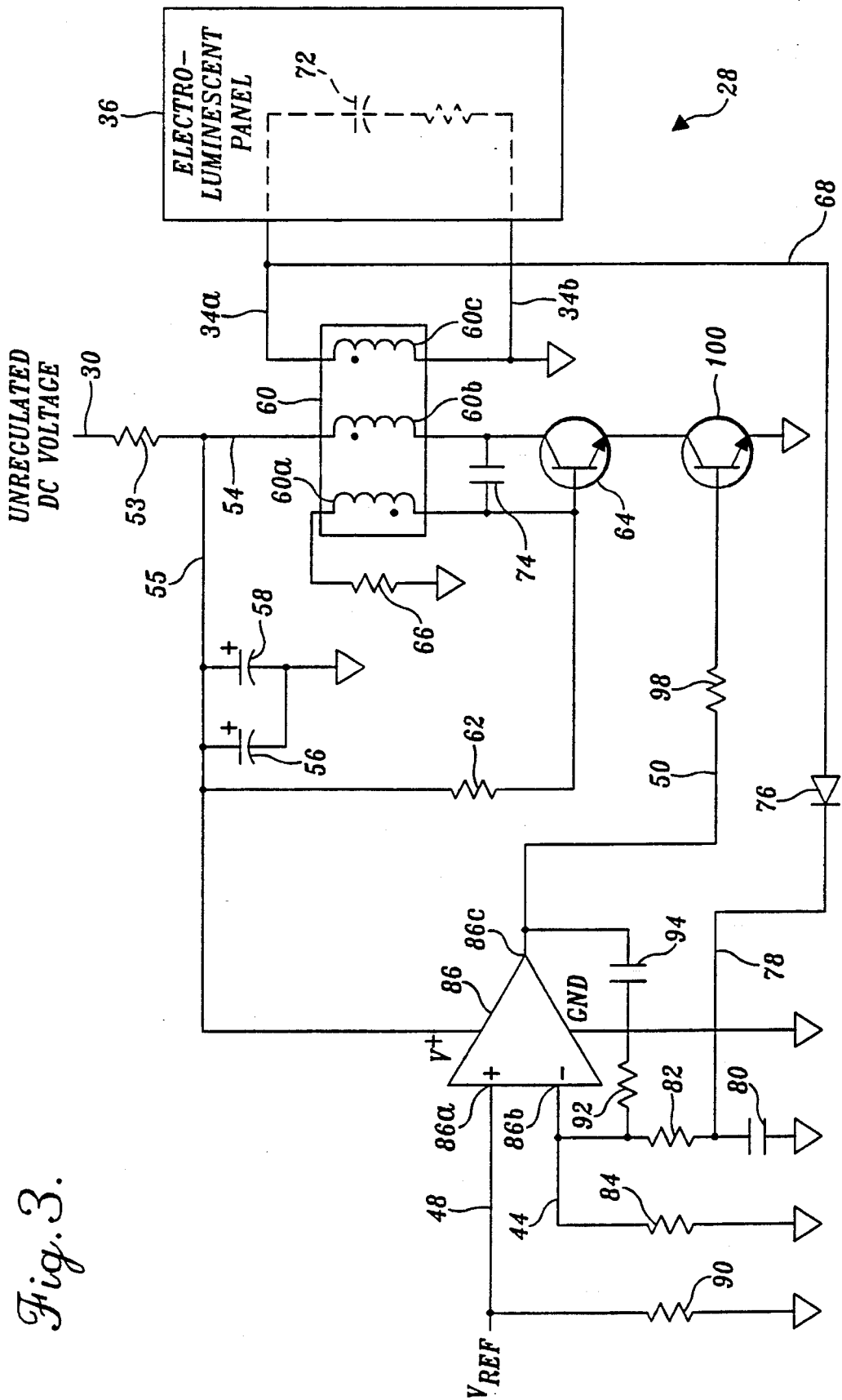
FIG. 3 is a detailed schematic diagram of the power supply for an electroluminescent panel, as represented by the FIG. 2 block diagram.

FIG. 2 is a block diagram of a regulated electroluminescent panel power supply 28 according to the present invention. An unregulated DC input voltage provided over a line 30 is used to drive a DC-to-AC inverter 32 to produce an AC output voltage that is carried on lines 34. The AC output voltage on lines 34 is directly connected to an electroluminescent panel 36, providing power to energize the electroluminescent panel. With this design, a desired resonant frequency interaction between electroluminescent panel 36 and inverter 32 is maintained. That is, as the capacitance of electroluminescent panel 36 decreases with age, the oscillation frequency of DC-to-AC inverter 32 increases. This compensation for changes in the capacitance of the electroluminescent panel 36 ensures a steady light intensity from electroluminescent panel.

To compensate for changes in unregulated DC input voltage provided over line 30, the AC output voltage conveyed on lines 34 from DC-to-AC inverter 32 is also connected to a feedback circuit 38. Feedback circuit 38 comprises two stages, a rectification and filtering stage 42, followed by a comparator stage 46. At rectification and filtering stage 42, the AC output voltage output from inverter 32 is rectified and filtered to produce a DC signal having an amplitude corresponding to the amplitude of the inverter AC output voltage. The rectified and filtered signal is conveyed on a line 44 to an input of a comparator 46, which compares the amplitude of this signal with that of a DC reference voltage $V_{REF}$ input on a line 48. This reference voltage is set to a level selected to maintain the electroluminescent panel at a desired brightness. A switch 47 is provided to control the application of the reference voltage to comparator 46 and when opened, turns off electroluminescent panel 36. Based on a comparison of the rectified and filtered signal and the reference voltage signal, comparator 46 generates a control signal that is output on a line 50. Line 50 is connected to DC-to-AC inverter 32.

In operation, feedback circuit 38 compensates for changes in the unregulated DC input voltage on line 30 as follows. Any fluctuations in the DC input voltage will initially cause the amplitude of the AC voltage output from DC-to-AC inverter 32 to begin to change. If the DC input voltage drops, the AC output voltage generated by the inverter will correspondingly begin to drop. This reduction in the AC output voltage is monitored by feedback circuit 38, which rectifies and filters the AC output of the inverter, and compares the rectified and filtered signal with the desired signal level represented by the reference voltage signal on line 48. In this example, since the AC output voltage is dropping, the comparator generates a control signal on line 50 to DC-to-AC inverter 32, which causes the inverter to boost the amplitude of its output. The same control action applies (but in the opposite sense) if the unregulated DC input voltage on line 30 increases. The greater AC output voltage generated by inverter 32 causes feedback circuit 38 to generate a control signal on line 50 that forces inverter 32 to reduce the amplitude of its AC output voltage. In this manner, the AC output voltage on lines 34 from DC-to-AC inverter 32 is regulated to remain substantially constant, regardless of changes in the DC input voltage on line 30.

A schematic diagram of a power supply circuit for an electroluminescent panel using the above feedback technique is given in FIG. 3. The principal active components comprising power supply 28 are as follows: a transformer 60 and an NPN transistor 64 comprise the DC-to-AC inverter; and, a diode 76, an operational amplifier 86, and an NPN transistor 100 comprise the feedback circuit.

The voltage reference signal $V_{REF}$ is used to enable or disable the output of power supply 28 (depending upon the condition of switch 47, shown in FIG. 2), as well as to set the desired operating level of the electroluminescent panel. $V_{REF}$ is connected across a load resistor 90 and to a noninverting input terminal 86a of operational amplifier 86. An output terminal 86c of operational amplifier 86 is connected to the base of transistor 100 through a resistor 98. Output terminal 86c is also connected back to the inverting input terminal 86b of operational amplifier 86 through a capacitor 94 and a resistor 92. When $V_{REF}$ is set to a desired amplitude, operational amplifier 86 attempts to drive its inverting terminal 86b to the same potential. This action generates a control signal on line 50, which, since it is coupled to the base of NPN transistor 100, biases the NPN transistor 100 into conductance, causing current to flow between its collector and emitter terminals. This current flow starts the DC-to-AC inversion.

The DC-to-AC inverter is configured as follows. The "undotted" terminal of a first winding 60a of transformer 60 is connected to ground through a resistor 66. The "dotted" terminal of first winding 60a is connected to the base of NPN transistor 64 and through a resistor 62 and a resistor 53 to the unregulated DC input voltage on line 30. The dotted terminal of a second winding 60b is connected to the unregulated DC input voltage through a resistor 53. The undotted terminal of second winding 60b is connected to the collector of NPN transistor 64. Both first winding 60a and second winding 60b are inductively coupled to an output winding 60c of transformer 60. Output winding 60c is connected in parallel with electroluminescent panel 36, which has a characteristic capacitance, as indicated by a capacitor 72.

Oscillation of the DC-to-AC inverter commences after $V_{REF}$ causes a control signal to be output on line 50 that turns on NPN transistor 100. Current begins to flow through first winding 60a and second winding 60b of transformer 60, as well as the collector and emitter terminals of NPN transistors 64 and 100. Because these two windings are inductively coupled such that a positive current flow in one induces a positive current flow in the other, the current induced by second winding 60b in first winding 60a comprises a positive feedback signal. Current through second winding 60b progressively increases as the voltage developed across first winding 60a drives the base of NPN transistor 64 so that the transistor conducts more heavily, until it reaches saturation. As NPN transistor 64 reaches saturation, the increase in current flow through it ceases, at which point the positive bias applied to the base of NPN transistor 64 decreases. The falling current flow in first winding 60a causes the current in second winding 60b to decrease. This feedback produces an oscillation, the frequency of which is dependent upon the inductance of transformer 60 windings and capacitance of capacitor 74.

Because of the mutual inductance of the windings, and the high number of turns of output winding 60c, the frequency of oscillation is heavily dependent upon the inductance of output winding 60c and the capacitance of electroluminescent panel 36. In the preferred embodiment, these components are selected such that the oscillation frequency for the circuit ranges between 300 to 500 Hz depending upon the capacitance of electroluminescent panel 36. Capacitor 74 is included to prevent any harmonic frequencies from developing in transformer 60 during these oscillations.

The oscillation of the inverter thereby induces an AC output voltage 68 across output winding 60c. The high turns ratio of output winding 60c with respect to the other transformer windings acts to boost the output voltage to a level necessary to activate electroluminescent panel 36. In the preferred embodiment of the invention, the output voltage is set to about 300 volts peak-to-peak. This voltage remains relatively constant as long as the unregulated DC input voltage does not vary. If the input voltage fluctuates, the AC output voltage on lines 34 will likewise begin to change. Capacitor 56 and capacitor 58 are used to filter noise and higher frequency fluctuations of DC input voltage on line 30. Any remaining changes in the input voltage are compensated by the feedback circuit.

The feedback circuit is coupled across output winding 60c of transformer 60. Diode 76 rectifies the AC output voltage to produce a rectified signal on a line 78. The rectified signal is further filtered by a capacitor 80, and reduced in amplitude by resistor 82 and resistor 84, which comprise a voltage divider. The rectified and filtered signal on line 44 is connected to inverting input 86b of operational amplified 86. As discussed earlier, the amplitude of the rectified and filtered signal corresponds to the amplitude of the AC output voltage.

Operational amplifier 86 compares this amplitude with $V_{REF}$, corresponding to the desired amplitude of the AC voltage to the electroluminescent panel. A resistor 92 and a capacitor 94 are connected in series between output terminal 86c and non-inverting input terminal 86b to provide feedback for operational amplifier 86. If the filtered signal exceeds $V_{REF}$, then control signal on line 50 is driven lower in proportion to the difference, reducing the amount of current through NPN transistor 100 and thus, through second winding 60b. This reduced current through second winding 60b reduces the AC output voltage proportionally. If the filtered signal on line 44 is less than $V_{REF}$, then the control signal on line 50 is driven higher, increasing the amount of current through NPN transistor 100 and second winding 60b. This increased current flow through second winding 60b increases the amplitude of AC output voltage. The constant feedback through diode 76 and operational amplifier 86 ensures that the AC output voltage remains relatively constant over a wide range of fluctuation of the unregulated DC input voltage.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A power supply for an electroluminescent panel that is driven by an unregulated direct current (DC) voltage source, said power supply comprising:

(a) a variable frequency oscillator connected to an electroluminescent panel having a characteristic capacitance, said oscillator generating a continuous, alternating current (AC) voltage having a frequency that varies in response to a change in the capacitance of the electroluminescent panel and an amplitude that varies in response to a level of DC that is coupled to an input of the oscillator, (b) a transformer having a plurality of windings and comprising an inductive portion of the oscillator, said transformer stepping-up the AC voltage generated by the oscillator to an amplitude suitable to drive the electroluminescent panel; and (c) a feedback circuit connected between one of the plurality of windings of the transformer and the input of the oscillator, said feedback circuit including a rectifier for rectifying an AC signal on said one of the plurality of windings, producing a corresponding rectified signal and controlling the level of DC that is coupled to the input of the oscillator in response to the rectified signal, to adjust the amplitude of the AC voltage generated by the oscillator if it varies due to fluctuations in the unregulated DC voltage source input to the power supply in order to maintain a stable light level from the electroluminescent panel.

2. The power supply of claim 1, wherein the oscillation frequency of the variable frequency oscillator varies as the capacitance of the electroluminescent panel decreases due to age.

3. The power supply of claim 1, wherein said oscillator further comprises:

(a) a first transistor having a base, a collector, and an emitter, the collector of the first transistor being connected to one of the windings of the transformer; and (b) a second transistor having a base, a collector, and an emitter, said second transistor being connected to the first transistor in a cascade configuration, the base of the second transistor acting as the input of the oscillator such that changes in the level of DC coupled to the base of the second transistor varies a current through both the first transistor and one of the windings of the transformer.

4. The power supply of claim 3, wherein the emitter of said first transistor is connected in series with the collector of said second transistor, and wherein the first transistor controls current flow through the emitter and collector of said first transistor.

5. The power supply of claim 1, wherein said transformer has three windings, one of which is coupled in parallel with the electroluminescent panel.

6. The power supply of claim 5, wherein two of the three windings of the transformer are coupled to the unregulated DC voltage.

7. The power supply of claim 5, wherein the two windings that are coupled to the unregulated DC voltage are inductively coupled such that a positive current flow in one induces a positive current flow in the other.

8. The power supply of claim 1, wherein said feedback circuit further comprises a comparator to compare the rectified signal with a reference voltage level, said reference voltage level being selected to maintain a stable light intensity output from the electroluminescent panel.

9. The power supply of claim 8, further comprising a filter for filtering the rectified signal.

10. The power supply of claim 8, wherein the reference voltage level is controlled to selectively energize and deenergize the electroluminescent panel.

11. The power supply of claim 1, wherein said power supply further comprises a capacitance connected between an input from the unregulated DC voltage source and a ground, said capacitance filtering fluctuations in the unregulated DC voltage.

12. A power supply for an electroluminescent panel having a characteristic capacitance, said power supply being driven by an unregulated DC voltage source, said power supply comprising:

(a) a transformer including a plurality of input windings, said plurality of windings including a first input winding that is connected to an unregulated DC voltage source, a second input winding that is connected to the unregulated DC voltage source and is driven by a current source, and an output winding that produces a stepped-up AC voltage;

(b) an oscillator having a resonant frequency determined at least in part by the capacitance of the electroluminescent panel and an inductance of the output winding of the transformer;

(c) a rectifier connected to the output winding of the transformer and generating a rectified signal from the AC voltage produced by the output winding of the transformer; and (d) a comparator with a first input, a second input, and an output, said first input being connected to the rectified signal, said second input being connected to a reference voltage level, and said output being connected to the current source to control an amplitude of the stepped-up AC voltage produced by the output winding of the transformer, to maintain a stable light level output from the electroluminescent panel.

13. The power supply of claim 12, wherein said output winding is coupled in parallel with the electroluminescent panel.

14. The power supply of claim 12, wherein the oscillation frequency of the variable frequency oscillator increases as the capacitance of the electroluminescent panel decreases due to age.

15. The power supply of claim 12, wherein the current source further comprises:

(a) a first transistor having a base, a collector, and an emitter, the collector of the first transistor being connected to the second input winding of the transformer; and (b) a second transistor having a base, a collector, and an emitter, said second transistor being connected to the first transistor in a cascade configuration, the base of the second transistor comprising the input of the oscillator such that changes in the level of a DC voltage on the output of the comparator coupled to the base of the second transistor varies a current through both the first transistor and the second input winding of the transformer.

16. The power supply of claim 15, wherein said second transistor controls the current flow through the emitter and collector of the first transistor.

17. The power supply of claim 12, further comprising a filter for filtering the rectified signal.

18. The power supply of claim 12, wherein the reference voltage level is controlled to selectively energize and deenergize the electroluminescent panel.

19. The power supply of claim 12, said power supply further comprising a capacitance connected between the unregulated DC voltage source and a ground, said capacitance being used to filter noise and fluctuations in the unregulated DC voltage.

20. A power supply that is driven by an unregulated DC voltage source, said power supply energizing an electroluminescent panel and comprising:

(a) oscillator means for generating a continuous, AC signal having a frequency that varies in response to a change in capacitance of an electroluminescent panel and an amplitude that changes in response to a control signal that is coupled to an input of the oscillator means;

(b) transformer means for stepping-up the AC signal generated by the oscillator, producing an AC output voltage with an amplitude suitable to drive the electroluminescent panel; and (c) control means for monitoring the AC output voltage of the transformer means and for producing the control signal that is coupled to the input of the oscillator means, said control means including a rectifier that is coupled to the transformer means to produce a rectified signal corresponding to the AC output voltage, said control signal controlling the amplitude of the AC output of the transformer means as a function of the rectified signal and a reference signal if the AC output varies due to fluctuations in the unregulated DC voltage source input to the power supply, in order to maintain a stable light level output from the electroluminescent panel.

* * * * *